US008292348B2

(12) United States Patent
Villeminey

(10) Patent No.: US 8,292,348 B2
(45) Date of Patent: Oct. 23, 2012

(54) VEHICLE DOOR ASSEMBLY

(75) Inventor: Jean-Paul Villeminey, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 79 days.

(21) Appl. No.: 12/710,492

(22) Filed: Feb. 23, 2010

(65) Prior Publication Data
US 2011/0204681 A1 Aug. 25, 2011

(51) Int. Cl.
B60J 1/08 (2006.01)
(52) U.S. Cl. .................................... 296/146.1
(58) Field of Classification Search ............... 296/146.1, 296/187.03, 203.03, 147, 151, 146.9, 187.12; 180/126
See application file for complete search history.

(56) References Cited

U.S. PATENT DOCUMENTS

| 3,977,712 | A | * | 8/1976 | Northrop | 292/338 |
|---|---|---|---|---|---|
| 4,005,789 | A | * | 2/1977 | Gladwin et al. | 414/517 |
| 4,145,066 | A | * | 3/1979 | Shearin | 280/166 |
| 4,175,495 | A | * | 11/1979 | Kleim | 105/450 |
| 4,216,725 | A | * | 8/1980 | Hallam | 105/348 |
| 4,235,047 | A | * | 11/1980 | Turner | 49/371 |
| 5,094,501 | A | * | 3/1992 | Gersmann | 296/155 |
| 5,876,086 | A | * | 3/1999 | Lagrou et al. | 296/146.11 |
| 5,895,086 | A | * | 4/1999 | Carico | 296/37.6 |
| 6,053,561 | A | * | 4/2000 | Hojnowski et al. | 296/146.11 |
| 6,502,885 | B1 | * | 1/2003 | Gammon et al. | 296/37.13 |
| 6,874,839 | B2 | * | 4/2005 | Acker et al. | 296/57.1 |
| 6,921,492 | B2 | * | 7/2005 | De Gaillard | 296/26.07 |
| 2008/0277956 | A1 | * | 11/2008 | Karuppaswamy | 296/37.1 |
| 2010/0012411 | A1 | * | 1/2010 | Fiacchino et al. | 180/89.11 |
| 2011/0056138 | A1 | * | 3/2011 | Kovie | 49/366 |
| 2011/0222996 | A1 | * | 9/2011 | Johnson et al. | 414/327 |

* cited by examiner

Primary Examiner — Kiran B Patel
(74) Attorney, Agent, or Firm — Quinn Law Group, PLLC

(57) ABSTRACT

A vehicle includes a vehicle body and a vehicle door assembly. The door assembly is selectively movable with respect to the body between open and closed positions. The door assembly includes an upper portion and a lower portion. The lower portion is selectively movable relative to the upper portion such that the height of the door above the ground is selectively variable.

7 Claims, 3 Drawing Sheets

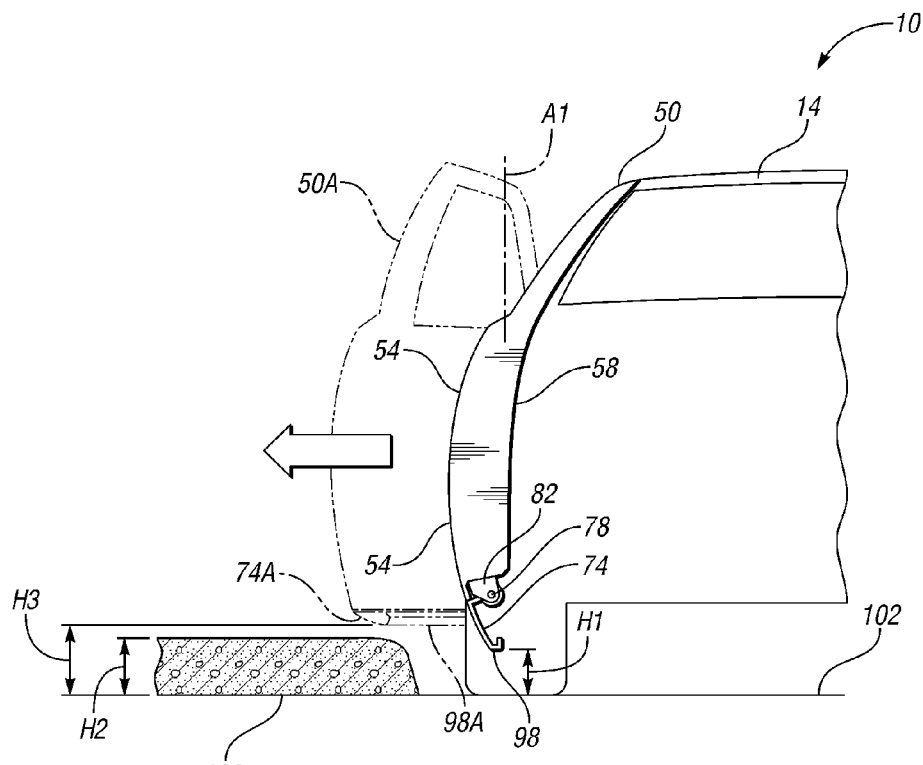
FIG. 5
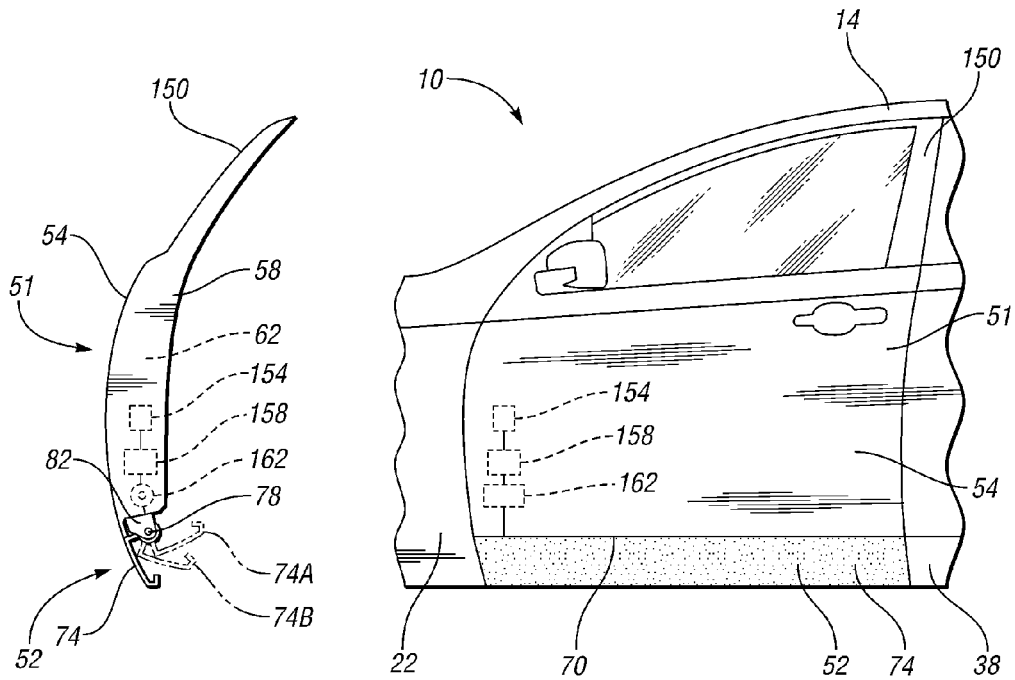
FIG. 6
FIG. 7

VEHICLE DOOR ASSEMBLY

TECHNICAL FIELD

This invention relates to vehicle door assemblies.

BACKGROUND OF THE INVENTION

Vehicles typically include a body defining a passenger compartment. Doors are movable between closed and open positions to selectively seal the passenger compartment and permit ingress and egress to the passenger compartment.

SUMMARY OF THE INVENTION

According to a first aspect of the disclosure, a vehicle includes a vehicle body defining an opening, and a door assembly having an upper portion and a lower portion. The upper portion is operatively connected to the vehicle body for movement between a closed position in which the door assembly obstructs the opening and an open position in which the door assembly does not obstruct the opening. The lower portion is selectively rotatable with respect to the first portion.

According to a second aspect of the disclosure, a vehicle includes a vehicle body defining an opening, and a door assembly having an upper portion and a lower portion. The upper portion is rotatably mounted with respect to the vehicle body and is selectively rotatable about a first axis between a closed position, in which the door assembly obstructs the opening, and an open position, in which the door assembly does not obstruct the opening. The lower portion defines the lowest extent of the door assembly and is selectively movable with respect to the first portion between an extended position and a retracted position. The lowest extent of the door assembly is higher when the lower portion is in the retracted position than in the extended position.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 5 is a schematic, rear view of the vehicle body and door assembly of FIG. 1;

FIG. 6 is a schematic, rear view of an alternative door assembly in accordance with the claimed invention; and FIG. 7 is a schematic, side view of the door assembly of FIG. 6 mounted to a vehicle body in a closed position.

DESCRIPTION OF THE PREFERRED EMBODIMENTS

Figure 1:
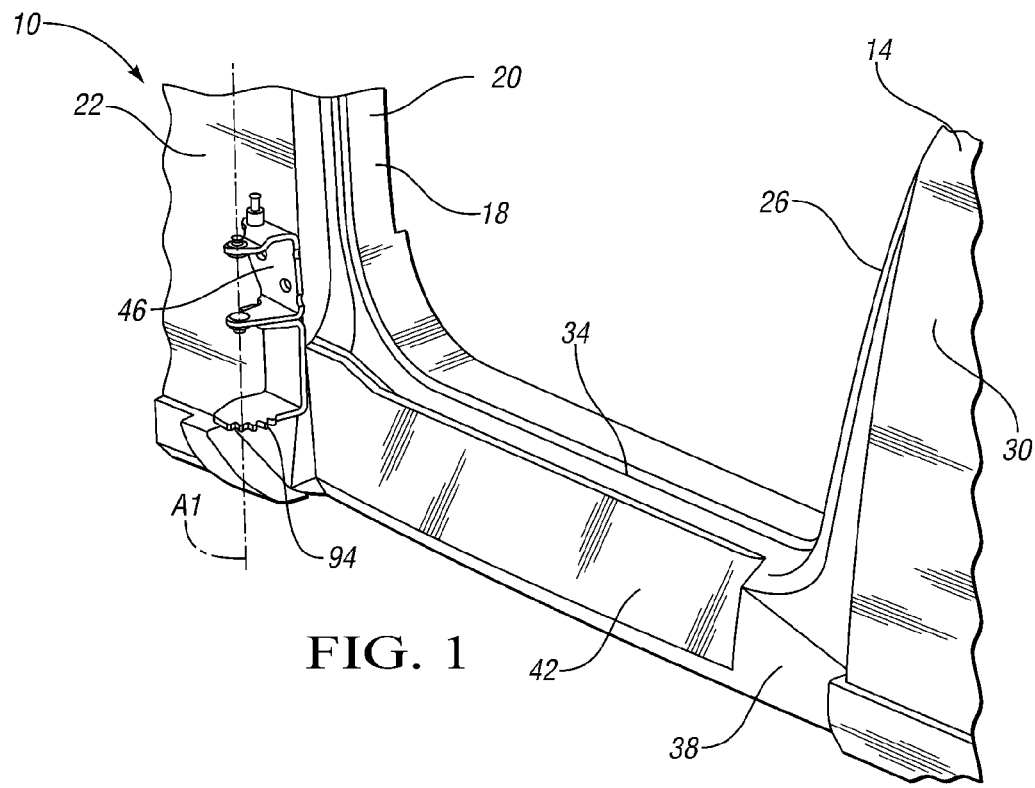
FIG. 1 is a schematic, perspective view of a portion of a vehicle body defining a door opening.

Referring to FIG. 1, a vehicle 10 includes a vehicle body 14 that defines a door opening 18. The forward edge 20 of the door opening 18 is defined by a front pillar 22. The rearward edge 26 of the door opening 18 is defined by a rear pillar 30.

The lower edge 34 of the door opening 18 is defined by a rocker panel 38. The rocker panel 38 defines a concavity 42 in its outboard surface below the door opening 18, and thus the rocker panel 38 provides a reduced transverse distance between the passenger seat (not shown) and the exterior of the vehicle 10, which may facilitate passenger egress and ingress.

Figure 2:
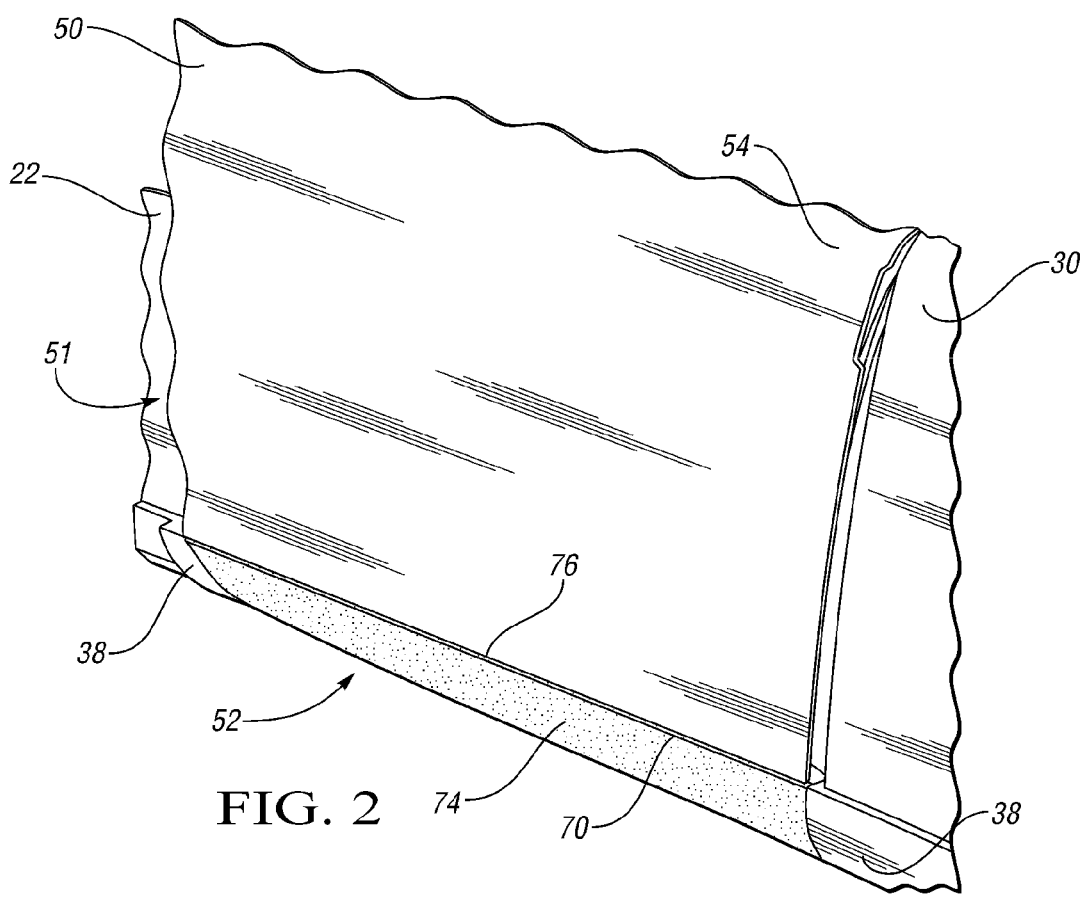
FIG. 2 is a schematic, perspective view of the vehicle body of FIG. 1 with a door assembly in a closed position obstructing the door opening.

The body 14 includes two hinges, only one of which is shown at 46. The hinges 46 are mounted to the front pillar 22. Referring to FIGS. 1 and 2, a door assembly 50 includes an upper portion 51 and a lower portion 52. The upper portion 51 of the door assembly 50 is mounted to the hinges 46 for selective rotation with respect to the body 14 about a generally vertical axis A1. More specifically, the door assembly 50 is selectively rotatable about axis A1 between a closed position, as shown in FIG. 2, and an open position. When the door assembly 50 is in the closed position, the door assembly 50 obstructs the door opening 18, as understood by those skilled in the art.

Figure 3:
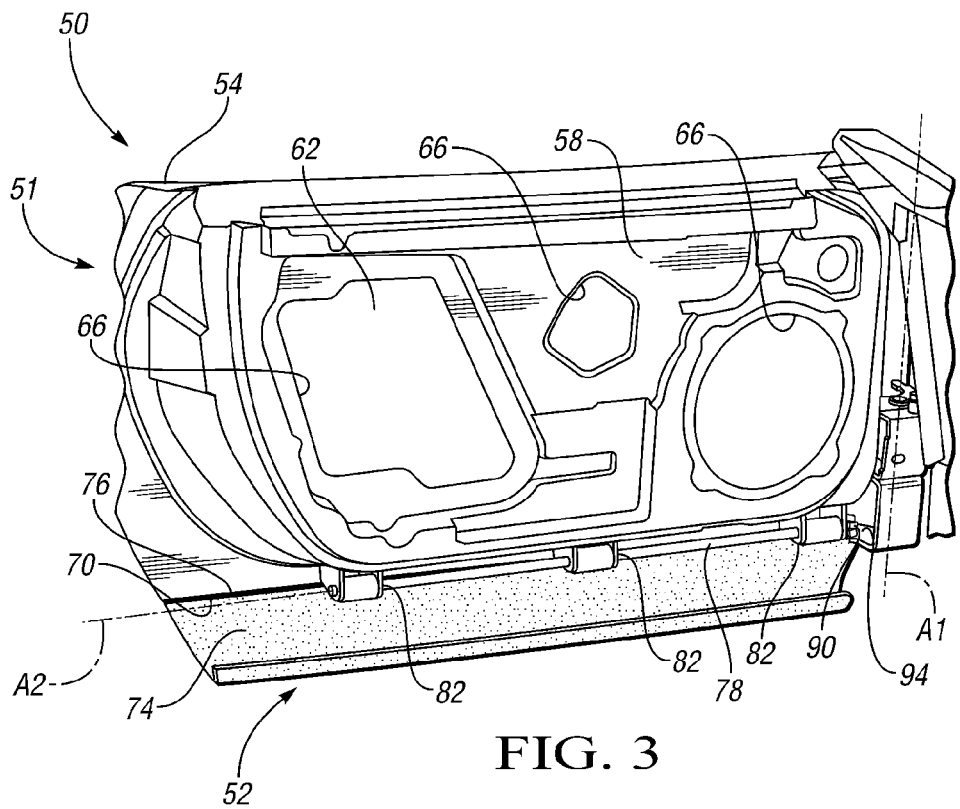
FIG. 3 is a schematic, perspective view of the door assembly of FIG. 2.

Referring to FIG. 3, in the embodiment depicted, the upper portion 51 of the door assembly 50 includes an outer panel 54 and an inner panel 58. The inner panel 58 and the outer panel 54 are operatively connected to one another, such as by welding, hem flanges, etc., such that the panels 54, 58 cooperate to define a door cavity 62 therebetween, as understood by those skilled in the art. The outer panel 54 defines a portion of the exterior surface of the vehicle 10. The inner panel 58 defines a plurality of apertures 66 of various sizes and shapes for providing access to the door cavity 62. For example, door hardware, such as window regulators, handles, latches, lock rods, speakers etc., are installed inside the door cavity 62 via the apertures 66, as understood by those skilled in the art.

Figure 4:
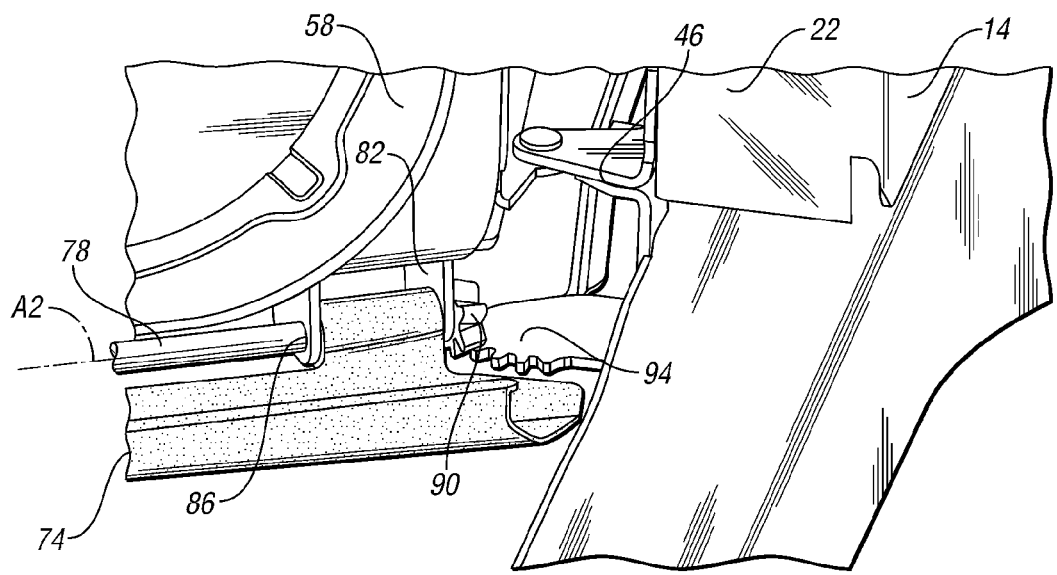
FIG. 4 is a schematic, perspective view of a gear train interconnecting the door assembly and the vehicle body.

The inner panel 58 and the outer panel 54 terminate at a lower edge 70. The lower portion 52 of the door assembly 50 includes a lower panel 74. The panel 74 is mounted to the upper portion 51 such that the panel 74 rotates about axis A1 with the upper portion 51. Accordingly, as the upper portion 51 rotates about axis A1, the entire door assembly 50 rotates about axis A1. The panel 74 has an edge 76 that is adjacent to, and parallel with, edge 70. Referring to FIGS. 3 and 4, the lower panel 74 is rotatably mounted with respect to the inner panel 58 such that the panel 74 is selectively rotatable with respect to the inner and outer panels 54, 58 about a generally horizontal axis A2.

More specifically, the panel 74 is rigidly mounted with respect to a shaft 78, which is rotatably connected to the inner panel 58 via a plurality of brackets 82. Each of the brackets 82 defines a respective hole 86. Holes 86 are linearly aligned along axis A2. The shaft 78 extends through the holes 86. A bevel gear 90 is mounted at one end of the shaft 78 for rotation therewith. A sector gear 94 is mounted to the front pillar 22. The bevel gear 90 is meshingly engaged with the sector gear 94. The gears 90, 94 are configured and positioned such that rotation of the door assembly 50 about axis A1 causes rotation of the gear 90 about axis A2. The panel 74 is mounted with respect to gear 90 via shaft 78, and thus rotation of gear 90 about axis A2 results in rotation of the shaft 78 and panel 74 about axis A2.

Referring to FIG. 5, the door assembly 50 is selectively rotatable with respect to the body 14 about axis A1 between a closed position, shown at 50, and an open position, shown in phantom at 50A. In the closed position, the door assembly 50 obstructs the door opening (shown at 18 in FIG. 1). When the door assembly 50 is in the open position, the door assembly 50 permits access to the vehicle interior via the opening 18. The door assembly 50 is configured such that the lower panel is in an extended position, as shown at 74, when the door assembly 50 is in the closed position. The panel 74 in the extended position extends generally vertically downward from the upper portion 51 to cover the rocker concavity (shown at 42 in FIG. 1). The operation of the gears 90, 94 and shaft 78 cause the panel 74 to rotate about axis A2 as the door assembly 50 is rotated from its closed position to its open position. More specifically, the door assembly 50 is configured such that the lower panel is in a retracted position, as shown in phantom at 74A, when the door assembly 50 is in the open position.

The panel 74 defines an edge 98 that is the lowest extent of the door assembly 50, which includes all objects mounted with respect to the inner and outer panels 54, 58 for rotation about axis A1. The edge 98 moves to an elevated position, shown in phantom at 98A, when the lower panel is in the retracted position shown at 74A.

When the panel 74 is in the extended position, the edge 98 is characterized by a vertical distance H1 above the ground 102. A curb 106 adjacent the vehicle 10 is characterized by a vertical distance H2 above the ground 102. The edge 98A is a height H3 above the ground 102 when in the elevated position. Distance H2 is greater than distance H1, and thus, without the rotation of the panel 74 from the extended position to the retracted position, the panel 74 would contact the curb 106 during movement of the door assembly 50 from its closed position to its open position. However, distance H3 is greater than H2, and thus the rotation of the panel 74 from the extended position to the retracted position permits full movement of the door assembly 50 to its open position without obstruction by the curb 106. The height of the panel 74, i.e., the vertical distance from edge 76 to edge 98, in the retracted position is less than the height of the panel 74 in the extended position.

Referring to FIGS. 6 and 7, wherein like reference numbers refer to like components from FIGS. 1-5, an alternative door assembly 150 for use with the vehicle 10 is schematically depicted. The door assembly 150 is mounted via hinges (shown at 46 in FIG. 1) for selective rotation with respect to the vehicle body 14 between a closed position, as shown in FIG. 7, and an open position. The door assembly 150 is substantially similar to the door assembly 50 shown in FIGS. 2-5, except that, door assembly 150 does not employ gears 90, 94 to rotate shaft 78 and lower panel 74. Instead, door assembly 150 includes a sensor 154, an electronic controller 158, and an actuator 162 disposed within the door cavity 62 between inner panel 58 and outer panel 54.

The sensor 154 is configured to monitor the rotational position of the door assembly 150 with respect to the vehicle body 14, and to transmit a signal indicative of the rotational position of the door assembly 150 to the controller 158. The actuator 162 is configured to selectively rotate the lower panel 74 about axis A2 (shown in FIGS. 3 and 4) from the extended position shown at 74 to the retracted position shown in phantom at 74A in FIG. 6, through an intermediate position shown in phantom at 74B in FIG. 6. Those skilled in the art will recognize a variety of actuators that may be employed within the scope of the claimed invention. Exemplary actuators 162 for use with the door assembly 150 include electric motors, solenoids, etc.

The actuator 162 is configured to rotate the lower panel 74 about axis A2 based on the rotational position of the upper portion 51 of the door assembly 150 with respect to the body 14. More specifically, the controller 158 transmits control signals to the actuator 162 such that the rotational position of the lower panel 74 about axis A2 is a function of the rotational position of the door assembly 150 about axis A1. The lower panel 74 is in the extended position when the door assembly 150 is in the closed position.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a vehicle body defining an opening;
   a door assembly having an upper portion and a lower portion;
   wherein the upper portion is rotatably mounted with respect to the vehicle body and is selectively rotatable about a first axis between a closed position, in which the door assembly obstructs the opening, and an open position, in which the door assembly does not obstruct the opening; and
   wherein the lower portion defines the lowest extent of the door assembly and includes a lower panel that is selectively movable with respect to the upper portion between an extended position and a retracted position;
   wherein the lowest extent of the door assembly is higher when the lower panel is in the retracted position than when the lower panel is in the extended position.

2. The vehicle of claim 1, wherein the upper portion includes an inner panel and an outer panel that are operatively connected to one another and that define a door cavity therebetween.

3. The vehicle of claim 1, wherein the door assembly is configured such that rotation of the upper portion about the first axis toward the open position causes the lower panel to move toward the refracted position.

4. The vehicle of claim 3, wherein the lower panel is rotatably mounted with respect to the upper portion and is selectively rotatable about a second axis between the extended and retracted positions.

5. The vehicle of claim 4, wherein the first axis is generally vertical; and wherein the second axis is generally horizontal.

6. The vehicle of claim 3, further comprising a first gear mounted with respect to the vehicle body;
   a second gear rotatably mounted with respect to the upper portion and meshingly engaged with the first gear;
   wherein the lower panel is mounted with respect to the second gear for rotation therewith.

7. The vehicle of claim 3, further comprising a sensor configured to monitor the rotational position of the upper portion with respect to the vehicle body; and
   an actuator operatively connected to the sensor and configured to move the lower panel based on the rotational position of the upper portion.

* * * * *